United States Patent [19]

Brazil

[11] 4,255,855
[45] Mar. 17, 1981

[54] NUTCRACKER

[76] Inventor: John W. Brazil, c/o Ms. Margie Del Moro, 1918 Alhambra Blvd., Sacramento, Calif. 95816

[21] Appl. No.: 98,402

[22] Filed: Nov. 29, 1979

[51] Int. Cl.³ .......................... A47J 43/26; B26B 17/00
[52] U.S. Cl. .................................... 30/120.5; 30/120.2
[58] Field of Search ................ 30/120.5, 120.2, 120.4, 30/120.1, 120.3, 184

[56] References Cited

U.S. PATENT DOCUMENTS

| D. 160,494 | 10/1950 | Hagen | 30/120.3 |
|---|---|---|---|
| 870,441 | 11/1907 | Kerr | 30/184 |
| 1,192,846 | 8/1916 | Boyer | 30/120.5 |
| 1,219,859 | 3/1917 | Paxton | 30/120.3 |
| 1,254,119 | 1/1918 | Chamberlain et al. | 30/120.5 |
| 1,331,351 | 2/1920 | Minor | 30/120.4 |
| 2,343,953 | 3/1944 | Canter | 30/184 |
| 2,378,084 | 6/1945 | Jackson | 30/120.3 |
| 2,804,111 | 8/1957 | Burchett | 30/120.3 |
| 3,048,208 | 8/1962 | Umanoff | 30/120.3 |
| 3,223,133 | 12/1965 | Brookey | 30/120.5 |

FOREIGN PATENT DOCUMENTS 273480  7/1927  United Kingdom .................. 30/120.3

Primary Examiner—Nicholas P. Godici
Assistant Examiner—J. T. Zatarga

[57] ABSTRACT

A nutcracker which includes a plunger slidable in a stationary sleeve, so that an adjustable end of the plunger is exerted against a nut abutted against a rigid anvil, so as to break open the nut shell, a pivotable handle providing a leverage force against the plunger.

1 Claim, 4 Drawing Figures

U.S. Patent
Mar. 17, 1981
4,255,855
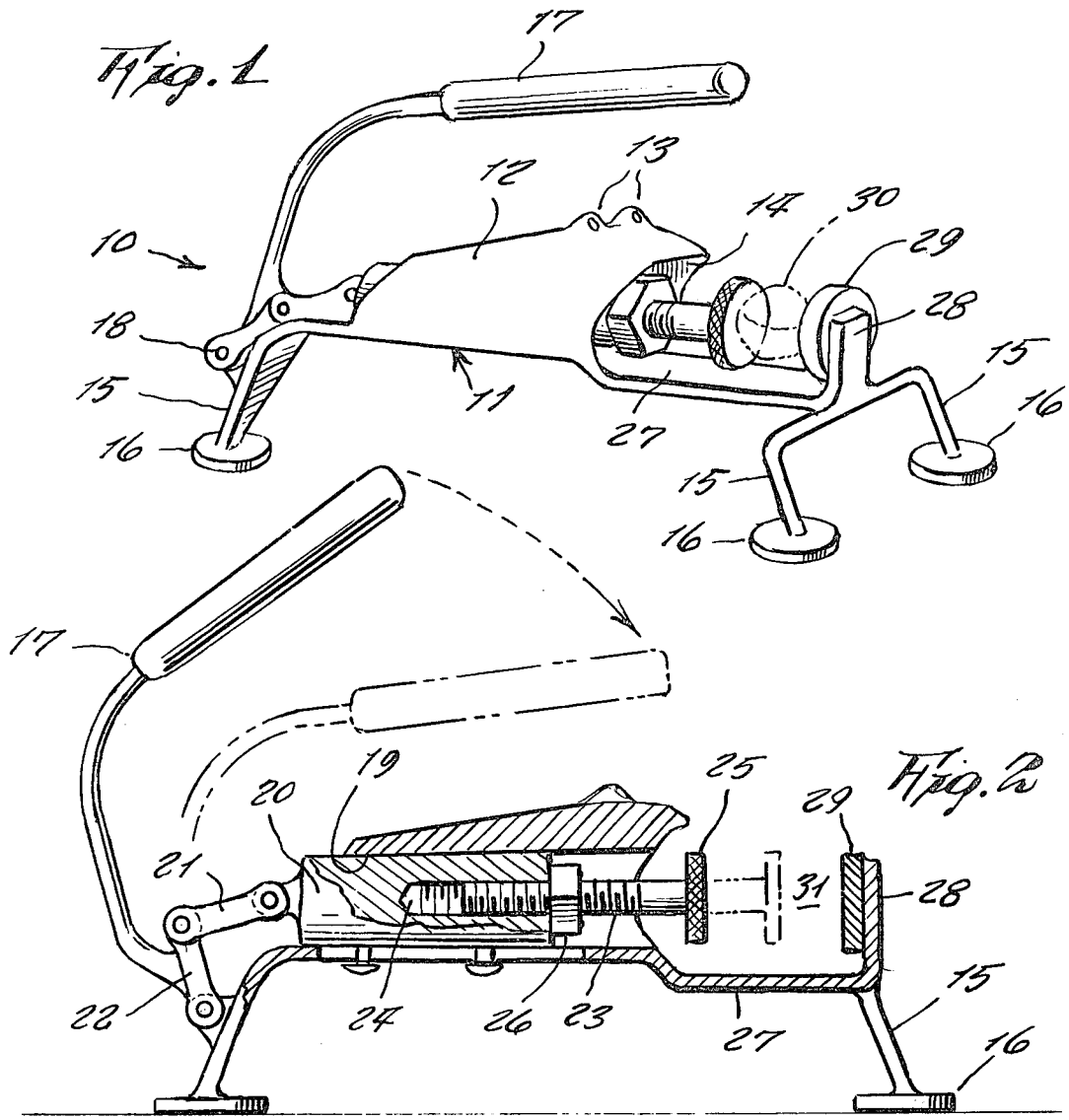
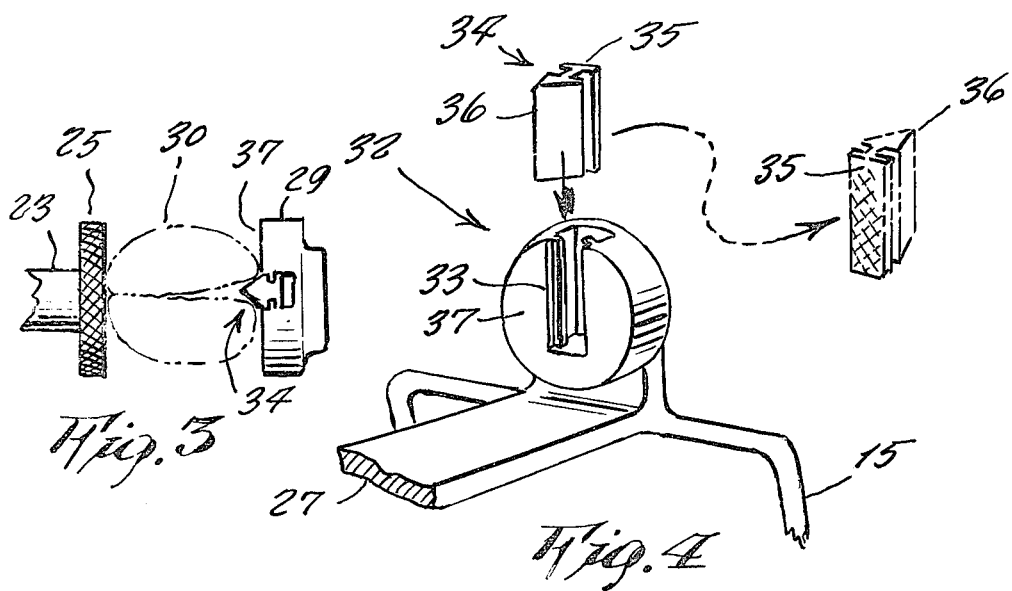

NUTCRACKER

This invention relates generally to nut cracking devices.

It is well known, that numerous nut crackers have been developed in the past, most of which cannot control the limit of a crushing force, so that the nut meat is often crushed, as well as the shell. Others having limits for crushing, are not easily adjustable for different sizes of nuts, and none are designed for selectively splitting the shell open.

Accordingly, it is a principal object of the present invention to provide a nutcracker, that is easily adjusted for cracking open any size of nut, without crushing the nut meat, and which selectively can split open a nut shell along its seam, such as that of a walnut, in order that the nut meat is obtained in an uninjured single piece, for decorating the top of a cake or cookie.

Another object is to provide a nutcracker, that is decorative in appearance, and amusing in operation.

Other objects are to provide a nutcracker, which is simple in design, inexpensive to manufacture, rugged in construction, easy to use, and efficient in operation.

These, and other objects, will be readily evident, upon a study of the following specification, and the accompanying drawing wherein:

FIG. 1 is a perspective view of the invention, shown in position cracking a nut;

FIG. 2 is a side cross-sectional view thereof, showing, in solid lines, the jaws spread open, so as to receive a nut;

FIG. 3 is a fragmentary top view, showing a modified design, in which an adjustable wedge is included, so as to split open a nut along its seam, and FIG. 4 is a view showing how the wedge can be reversed, so that its flat side faces a nut, in case it is not wished to split the nut on its seam.

Referring now to the drawing in grater detail, the reference numeral 10 represents a nutcracker, according to the present invention, wherein there is a rigid stationary base 11, made to resemble the appearance of a frog or other fantastic animal, by including a configurated body 12, having eyes 13 on top, and a mouth 14 at one end. The body is integral with three spread-out legs 15, having a flat pad 16 at their lower ends, for resting upon any supporting surface. An upwardly curved handle 17, pivoted on a rivet 18 at one end of the base, gives the appearance of an animal tail that can wiggle.

The body includes a cylindrical, horizontal hole 19 therethrough, which, at one end, forms the mouth 14. A cylindrical plunger 20, slidable in the hole, is connected pivotally, at one end, to a linkage 21, connected pivotally to an arm 22 that is integral with a base end of the handle, so that, when the handle is pivoted, the plunger slides. A bolt 23, adjustably threaded in an opening 24, at the opposite end of the plunger, includes an enlarged, knurlled head 25 protruding out of the mouth 14. A locknut 26 is fitted on the bolt, for locking against the plunger end.

The body 12 includes a forwardly extending lower jaw 27 from the mouth 14, the terminal end 28 of the jaw being upwardly bent vertically, and having an anvil 29 affixed to its inward side. lA pair of the legs 15 are formed integrally with the jaw 27, and extend downward therefrom.

In use, a nut 30 is placed between the anvil and the bolt head 25, and the handle is then pivoted forwardly, causing the plunger to slide, so as to crack open the nut shell. By adjusting the bolt in the threaded opening 24, the space 31, between the anvil and bolt head, is adjustable to receive different sizes of nuts, the space being made slightly less than the nut shell size, so that a final pivotal travel of the handle causes the nut cracking action.

In a modified design of nutcracker 32, shown in FIGS. 3 and 4, the anvil additionally includes a vertical slot 33, in which bar 34 is insertable with either opposite side 35 or 36 protruding outwardly. The side 35 is flat and knurlled, the side being flush with the face 37 of the anvil, when in an outwardly position. The side 36 is wedge-shaped, and, when in an outwardly position, protrudes further than the face 37, and, in which position, it serves to split apart the shell halves 38 of certain nuts, such as walnuts. The slot 33 extends rearwardly enough, so as to accommodate the wedge-shaped side 36, when not so used.

While various changes may be made in the detail construction, it is understood that such change will be within the spirit and scope of the present invention, as is defined by the appended claims.

What I claim is:

1. A nutcracker, comprising, in combination, a base having a hole through one end thereof, an anvil supported on an opposite end thereof, a space between said ends for placement of a nut therein, a plunger slidable in said holes a pivotable handle for sliding said plunger toward said anvil, and cracking a nut shell of said nut placed between said plunger and said anvil; an adjustable bolt on said plunger for controlling a length of said space, and a reversible bar slide-fitted in a slot on said anvil, one side of said bar being shaped with a projecting wedge, so as to split said nut shells therewith and an opposite side of said bar having a flat face that is knurlled, said reversible bar being selectively positioned with either said wedge or said flat, knurlled face toward said nut.

* * * * *